United States Patent [19]

Ziegenbalg et al.

[11] 4,244,928
[45] Jan. 13, 1981

[54] PROCESS FOR THE PRODUCTION OF PURE ALUMINUM OXIDE

[75] Inventors: Siegfried Ziegenbalg; Gerhard Haake; Gunter Geiler, all of Freiberg, German Democratic Rep.

[73] Assignee: VEB Mansfeld Kombinat William Pieck, Eisleben, German Democratic Rep.

[21] Appl. No.: 46,843

[22] Filed: Jun. 8, 1979

[30] Foreign Application Priority Data

Jan. 13, 1978 [DD] German Democratic Rep. ... 203210

[51] Int. Cl.$^3$ .............................. C01F 7/26
[52] U.S. Cl. ................................. 423/123; 423/128; 423/132
[58] Field of Search ................. 423/128, 132, 123

[56] References Cited

U.S. PATENT DOCUMENTS

| | | | |
|---|---|---|---|
| 2,476,979 | 7/1949 | Hoeman | 423/132 |
| 2,566,143 | 8/1951 | Redlich et al. | 423/132 |
| 2,958,580 | 11/1960 | Loevenstein | 423/128 |
| 3,079,228 | 2/1963 | Skay | 423/132 |
| 3,185,545 | 5/1965 | Scott | 423/128 |

FOREIGN PATENT DOCUMENTS 883311 11/1961 United Kingdom ............ 423/128

OTHER PUBLICATIONS

Scott, "Research", vol. 14, Feb. 1961, pp. 50–54.

Primary Examiner—Herbert T. Carter
Attorney, Agent, or Firm—Michael J. Striker

[57] ABSTRACT

The invention concerns a process for sulfuric acid treatment of clays or aluminiferous minerals to obtain pure aluminum oxide via a basic intermediate. The process finds application in the production of aluminum through fusion electrolysis and for the production of different types of alumina. The process provides a mass production method which is economically and technically superior over the prior art methods.

The mechanically and/or thermally pretreated raw material is subjected to a two-step pressure treatment with sulfuric acid solution. The aluminum sulfate solution is treated to reduce the iron with $SO_2$ and hydrolytic precipitation of basic aluminum sulfates. After separation of the salts from the mother liquor, which is returned to the process, the aluminum sulfate is thermally decomposed. The $SO_2/SO_3$-containing waste gases from the decomposition are used to renew the treatment acid.

4 Claims, 1 Drawing Figure

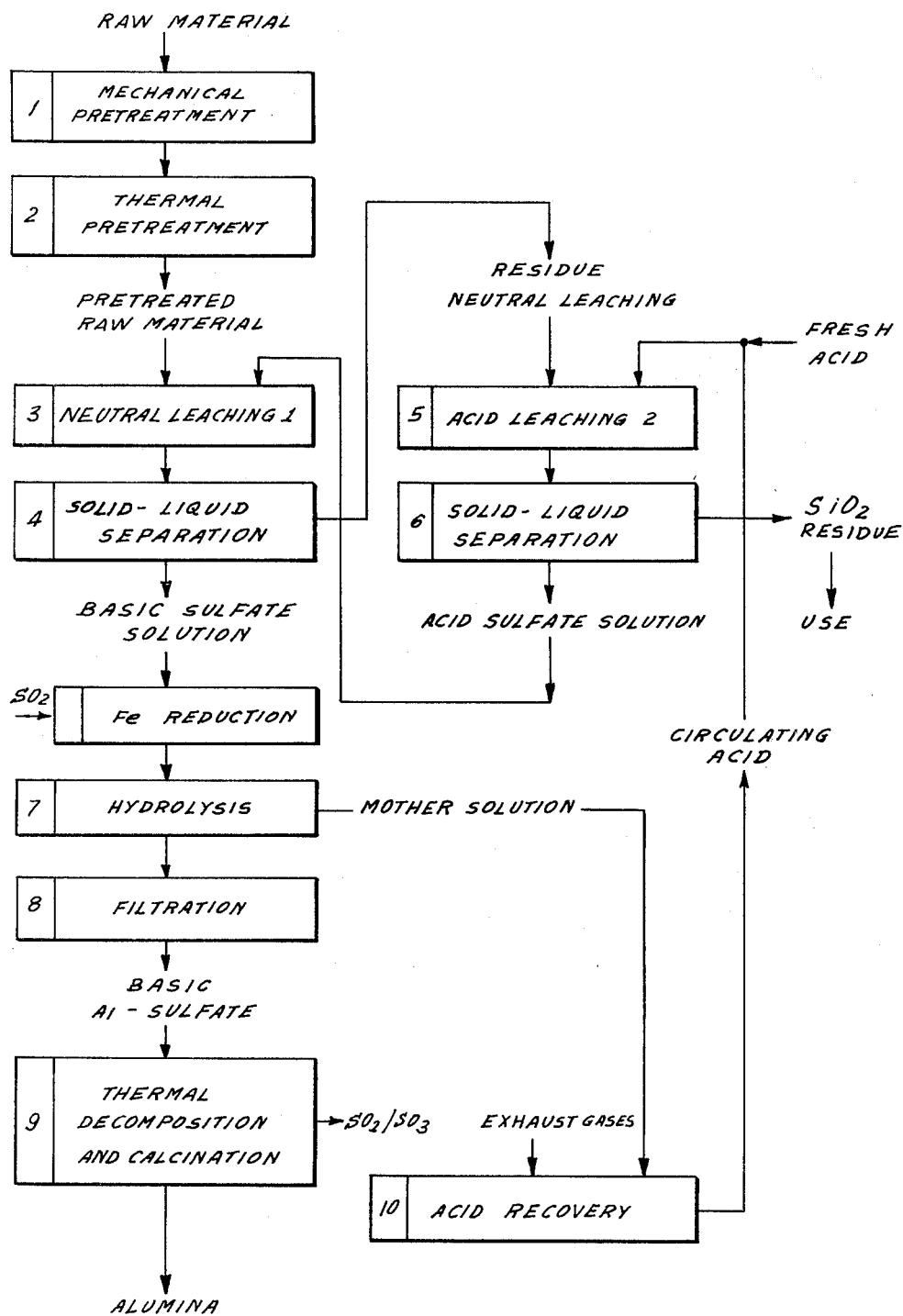

PROCESS FOR THE PRODUCTION OF PURE ALUMINUM OXIDE

CROSS-REFERENCE TO RELATED APPLICATION

This application is a continuation-in-part of my co-pending application Serial No. 001,159, filed January 4, 1979 now abandoned, said application entitled:

BACKGROUND OF THE INVENTION

The invention relates to a large scale technical process for sulfuric acid treatment of clays or aluminiferous minerals for the production of pure aluminum oxide via a basic intermediate.

The known methods for the production of aluminum oxide generally comprise the steps of treatment of $Al_2O_3$- containing minerals with sulfuric acid under pressure and at elevated temperatures, reduction of the iron in this solution in order to avoid its precipitation, hydrolysis of the aluminum sulfate solution and thermal decomposition of the precipitated basic aluminum sulfate (BAS).

In this context it is also recognized that the yield of solid hydrolysis product is very strongly dependent upon the basicity of the solution, expressed for example by the ratio of $SO_3$ to $Al_2O_3$. In order to achieve the lowest possible ratio, the addition of basic aluminum sulfate or active alumina has been suggested. For this purpose, either the basic sulfate produced during the pressure application step is employed, or else an alumina which remains active during the thermal decomposition is added. Through this method of correction, according to these proposals a substantial amount of basic sulfate or active alumina is recirculated through the system, inducing a substantial burdening on the system. This results in further energy and apparatus outlay, and the accompanying increase in costs.

An alternative method for increasing the basicity of the solution lies in the addition of alkali metal hydroxides or salts. Over a longer period of time, the addition of these chemicals leads to an inpermissible contamination of the product. In order to obtain a product of quality suitable for fusion electrolysis, corresponding purification steps are required, which again increase the apparatus and energy costs of the overall process.

Thus, it is clear that the known methods for sulfuric acid treatment of clays or aluminiferous minerals and the subsequent steps to the preparation of aluminum oxide are economically unfavorable because of high energy and apparatus costs. For this reason, these methods have not found large scale technical application. The recirculation of materials just as a necessary purification of the product are major disadvantages of the known procedures.

SUMMARY OF THE INVENTION

The object of the invention is to reduce the technical and energy costs of the known processes for the production of aluminum oxide through sulfuric acid treatment through a series of substantial changes in the procedure.

A further goal of the invention is the development of a technologically simple, economically suitable process which could be realized on the mass production scale and leads to a product of sufficient quality to allow it to be used directly in known methods for the generation of metallic aluminum.

These goals are achieved through a two-step pressure treatment of mechanically and/or thermally pre-treated clay or aluminiferous minerals with sulfuric acid at elevated temperature, a separation of the solution from insoluble residue, reduction of the iron in the solution, a hydrolytic precipitation of a solid basic aluminum sulfate and thermal decomposition to alumina accompanied by recovery of the acid circulated in the process from the decomposition gases.

The inventive process provides a method of few steps which is easily monitored. For example, the leaching of the clay, the preparation of a basic aluminum sulfate solution as well as the discharge of impurities with the silica residue is accomplished in only two process steps; similarly, the reduction of the solution to be hydrolyzed, the hydrolysis of the solution and the final crystallization to solid aluminum sulfate requires only one process step. This makes it possible for the first time to employ a system for mineral acid alumina treatment under economically and technically suitable conditions.

The inventive process is characterized by a continual initiation of the individual steps in the circulation, in particular through the composition of all the liquids, solutions and residues. A further characteristic of the process is the addition as well as the removal of important intermediates at specific points in the circulation. The inventive process is further defined by such reaction parameters as pressure, temperature and reaction time.

According to the invention, the process consists of the following work steps:

Mechanically and/or thermally pretreated clay or aluminiferous minerals are treated in a first leaching step with the filtrate from a second leaching step at 110°–150° C. for 15–60 minutes. The aim of this step is to achieve, along with the highest possible degree of leaching of the alumina, a separation of the iron contained in the solution as complex iron (III) sulfate compounds which are insoluble in the acid range. In this step an $Al_2O_3$ excess in the starting material of 60–120% related to the $Al_2O_3$ component to be leached is used.

For this first leaching step the condition is made that along with the highest possible degree of leaching of the alumina a separation of the iron additionally leached from the solid as complex iron (III) sulfate compounds which are insoluble in the acid range is achieved.

In particular, it has been found that for the first leaching step, or neutral leaching, it is preferable to reduce the temperature range to 115°–125° in order to avoid reduction of the yield and higher content of impurities in the basic sulfate. This temperature range requires a corresponding pressure of only about 2–3 atm. The residue from the first leaching step is filtered off, washed with water and treated again to remove the remaining soluble components with a 10–15% free sulfuric acid circulation solution at 100°–140° C. over a reaction time of 15–60 minutes. During the second leaching step, the working can be carried out at atmospheric pressure without any noticeable reduction in $Al_2O_3$ production or in the composition of the solution.

The reaction parameters for the first and second leaching steps are thus as follows:
Reaction time:
    15–60 minutes for each step
Temperature:

Step 1 115°–125° C.
Step 2 100°–140° C.
H$_2$SO$_4$ concentration:
  Step 1 5–7%
  Step 2 10–15%
Al$_2$O$_3$ yield:
  up to 90%, calculated from the Al$_2$O$_3$ content of the starting materials (Steps 1 and 2)

These parameters for the two steps make possible an apparatively simple process arrangement.

In the subsequent hydrolysis step, it is necessary to avoid a precipitation of the iron in the solution as Fe$^{3+}$. A reduction of the Fe$^{3+}$ to Fe$^{2+}$ is therefore advantageous. A preferred reducing agent is SO$_2$, which is introduced into the pre-hydrolysis solution at between about 20°–60° C. Omission of this step leads to precipitation of a basic sulfate of the trivalent iron, an analog of the aluminum compound, under the parameters of the pressure hydrolysis.

The filtrate of the first leaching step contains from about 50–110 g/l Al$_2$O$_3$ and is hydrolyzed at about 240° C. with the exclusion of oxygen in order to avoid reoxidation of the divalent iron. The preferred temperature for the hydrolysis is determined by economic considerations as well as the characteristics of the apparatus and the working materials. A hermetically sealed chamber, for example, may be used. The thus-obtained operating range lies preferably between 220° and 280° C.

The important parameters for the pressure hydrolysis are as follows:

| Duration: | 30 minutes |
|---|---|
| Weight ratio: | SO$_3$:Al$_2$O$_3$ 2.0–2.86 (Preferably 2.65) |
| Temperature: | 220–280° C. (Preferably 240° C.) |

The yield of the hydrolysis is between 50–70%.
The basic sulfate has the following composition:

| Al$_2$O$_3$ | 38.5–38.7% |
|---|---|
| SO$_3$ | 39.5–40.0% |
| Fe$_2$O$_3$ | 0.01–0.03% |
| TiO$_2$ | 0.01–0.02% |
| K$_2$O | 0.01–0.015% |
| Na$_2$O | 0.01–0.02% |
| SiO$_2$ | 0.01% |
| MgO | 0.01% |
| CaO | 0.01–0.2% |

Of importance with respect to the inventive process is the fundamental point, that a high yield of Al$_2$O$_3$ under the noted parameters without the addition of active alumina or other chemicals, previously thought to be necessary.

It has been found, that magnesium ions up to concentrations of 30–90 g/l MgSO$_4$ markedly increase the hydrolysis yield, without requiring the purification of the basic aluminum sulfate obtained during the hydrolysis, as the above-noted basic aluminum sulfate mixture demonstrates.

According to the invention, therefore, one may dispense with additives to increase the basicity of the hydrolysis solution. In practice this means a decided simplification of the process, as a burdening of the circulation of the materials with active alumina or basic aluminum sulfate is no longer necessary; a corresponding savings in energy and apparatus costs is thereby achieved.

In contradistinction to the alkali metal components of the starting material, which are discharged as marginally soluble compounds along with the leaching residue, the magnesium in the starting material remains in solution. With recognition of the achieved high yield in the hydrolysis, it is not necessary to add further magnesium compounds with starting materials containing magnesium.

When working with magnesium-free materials, a single addition of magnesium is sufficient to establish an optimal magnesium content. The magnesium level of the solution can be regulated when working with magnesium-containing raw materials through the discharge of small amounts of solution with subsequent separate work-up.

It has been found that up to 25% of the precipitated basic aluminum sulfate in the hydrolysis residue can redissolve under unfavorable cooling conditions. Thereby is the hydrolysis yield markedly lowered, the Al$_2$O$_3$ content of the circulating solution raised and the throughput of Al$_2$O$_3$ per apparatus volume reduced. Investigations have shown that the temperature range between 140°–80° C. must be crossed very quickly in order to minimize this problem. The resolvation effect is greater than 18% over a cooling period greater than 90 minutes, and is less than 4% over a cooling period of less than 10 minutes. In the inventive process, very short cooling times, preferably of about 10 minutes, can be achieved.

The recovery of the enthalpy of the hydrolysis mother liquor is performed in counter-current by adiabatic heat exchange and the heat thus obtained is utilized to heat up the prehydrolysis solution.

The basic aluminum sulfate separated by filtration after the pressure hydrolysis is then treated by a stepwise decomposition and subsequent calcination over $\gamma$-Al$_2$O$_3$ to $\alpha$-Al$_2$O$_3$ at temperatures from about 1100°–1300° C.

In order to recover the treatment acid the SO$_2$/SO$_3$ containing gases produced in the thermal decomposition of the basic aluminum sulfate to alumina are combined with intensive mixing and addition of air with the hydrolysis mother liquor containing iron ions as catalysts at 60°–80° C., preferably at 70° C. The relatively low concentrations of acids recovered through this technically and mechanically simple process are suitable for use in the treatment of raw materials under the given parameters.

The SiO$_2$—residue which remains after the second leaching step may be employed after the respective work-up in the packing glass industry as glass raw material, in the construction materials industry for the production of building materials, in the foundry industry as core binders, as filler material for the preparation of various inorganic and organic work materials and for other uses.

The process may be better described through an example and with reference to the sole FIGURE. The compositional values given represent states of equilibrium, from which the solutions and residues, in circulation and mixed together, no longer change.

BRIEF DESCRIPTION OF THE DRAWING

The sole FIGURE illustrates a scheme for a preferred embodiment of the inventive process.

DESCRIPTION OF THE PREFERRED EMBODIMENTS

Following hereafter is a description of an Example, which should be read in conjunction with the appended drawing.

About 1 ton of raw material, thermally and mechanically pretreated in steps 1 and 2, is treated in the first leaching step 3. The material, of which about 80% of the $Al_2O_3$ is in the form of soluble metakaolinite, has the following composition:

| | | | |
|---|---|---|---|
| $Al_2O_3$ | 362.0 kg | $TiO_2$ | 20.9 kg |
| $Fe_2O_3$ | 23.0 kg | $SO_3$ | 1.7 kg |
| MgO | 4.1 kg | $V_2O_5$ | 0.3 kg |
| $K_2O$ | 9.0 kg | $SiO_2$ + others | 551.1 kg |
| $Na_2O$ | 0.5 kg | | |
| CaO | 4.2 kg | | |

The clay is treated with stirring with a solution mixture from the acid leaching step 5, consisting of about 3.9 m³ filtrate and 0.5 m³ wash water of the following composition:

| | | | |
|---|---|---|---|
| $Al_2O_3$ | 233.0 Kg | MgO | 129.8 kg |
| $SO_3$ | 1246.0 Kg | $Na_2O$ | 0.5 kg |
| $Fe_2O_3$ | 47.8 Kg | $K_2O$ | 1.6 kg |

The treatment of the suspended material is carried out at about 120° C. under a pressure between about 0.5 and 1 h. Thereby about 61.3% of the soluble $Al_2O_3$ in the clay is removed, the accompanying impurities in the clay, such as iron, potassium and sodium, are converted in greater portion to insoluble basic sulfates along with a limited amount of the aluminum, and the non-soluble $SiO_2$ and $TiO_2$ in the clay are filtered off as residue in step 4.

After washing with 1 m³ water, the residue has the following composition:

| | | | |
|---|---|---|---|
| $Al_2O_3$ | 187.4 kg | MgO | 4.9 kg |
| $SO_3$ | 85.5 kg | $TiO_2$ | 26.0 kg |
| $Fe_2O_3$ | 40.1 kg | $V_2O_5$ | 0.2 kg |

This residue then undergoes a second leaching with 4 m³ of a circulating acid from step 5 with the composition

| | | | |
|---|---|---|---|
| $Al_2O_3$ | 152.1 kg | MgO | 126.2 kg |
| $SO_3$ | 1330.5 kg | $V_2O_5$ | 0.2 kg |
| $Fe_2O_3$ | 43.0 kg | | |

By analogy to the first leaching, at 130° C. under pressure 38.7% of the available $Al_2O_3$ portion is leached out. After filtration and washing of the residue with 4 m³ wash water, from which a portion has already been set aside for washing of the hydrolysis product, a solution of 4.4 m³ results, which, as already described, is used in the first leaching step. The residue of 854.7 kg $SiO_2$ has the composition

| | | | |
|---|---|---|---|
| $Al_2O_3$ | 77.8 kg | MgO | 1.3 kg |
| $SO_3$ | 51.5 kg | $TiO_2$ | 25.7 kg |
| $Fe_2O_3$ | 23.0 kg | $V_2O_5$ | 0.2 kg | and can be used for example in the construction materials industry.

The remaining 3.5 m³ of wash water with the composition

| | | | |
|---|---|---|---|
| $Al_2O_3$ | 16.2 kg | $SO_3$ | 50.0 kg |
| MgO | 2.8 kg | | | is used to wash the residue of the first leaching step and to replace the water loss during the recovery of $SO_3$ from the decomposition waste gases from the hydrolysis product in the to-be-described wet catalysis step 10.

After filtration of the leaching pulp from the first leaching in step 4 and washing of the residue a basic aluminum sulfate solution of 4.7 m³ is obtained with the following composition:

| | | | |
|---|---|---|---|
| $Al_2O_3$ | 407.6 kg | $K_2O$ | 0.1 kg |
| $SO_3$ | 1154.1 kg | $Na_2O$ | 0.2 kg |
| $Fe_2O_3$ | 30.7 kg | $SiO_2$ | 2.1 kg |
| MgO | 129.0 kg | $TiO_2$ | 0.1 kg |
| | | $V_2O_5$ | 0.4 kg |

The $SO_3$:$Al_2O_3$ ratio in this prehydrolysis solution is about 2.84. This solution, in order to achieve a stoichiometric reduction of the iron III ions to iron II, is treated with up to a threefold amount of $SO_2$ at 40° C.; under the appropriate apparatus parameters and with total exclusion of oxygen, the hydrolysis is undertaken over 30 minutes at 240° C. and a pressure of 30 atu. A solid and easily filtrable oxonium alunite crystallisate is obtained, which is filtered from the hydrolysis mother liquor after a very rapid cooling in order to avoid the redissolving effect. After washing the hydrolysis product with 3 m³ water and drying at 150° C., 692.9 kg of crystallisate is obtained with the following composition:

| | | | |
|---|---|---|---|
| $Al_2O_3$ | 268.00 kg | $TiO_2$ | 0.09 kg |
| $SO_3$ | 274.00 kg | $CrO_3$ | 0.03 kg |
| $Fe_2O_3$ | 0.08 kg | NiO | 0.07 kg |
| MgO | 0.06 kg | CuO | 0.07 kg |
| $K_2O$ | 0.07 kg | MnO | 0.03 kg |
| $Na_2O$ | 0.14 kg | $V_2O_5$ | 0.17 kg |
| $SiO_2$ | 0.04 kg | $SnO_2$ | 0.07 kg |
| CaO | 0.80 | | |

This sufficiently pure intermediate can after decomposition and calcination at 1100°–1300° C. as $\gamma$-$Al_2O_3$-rich alumina go directly into a fusion electrolysis for recovery of aluminum. The decomposition gases, which contain about 3% $SO_2$, are mixed with at least four volumes of air, saturated with wash water from the filtrations 6 and 8 to a water vapor partial pressure of 0.32 atm and mixed at a temperature between 70°–80° C. in a suitable apparatus with 4.2 m³ hydrolysis mother liquor of the composition:

| | | | |
|---|---|---|---|
| $Al_2O_3$ | 123.4 kg | MgO | 126.2 kg |
| $SO_3$ | 848.3 kg | $TiO_2$ | 0.1 kg |
| $Fe_2O_3$ | 30.3 kg | $V_2O_5$ | 0.2 kg |

A virtually 100% oxidation of the $SO_2$ to sulfuric acid follows through the catalytic action of the iron III ions in combination with oxygen from the air. In order to avoid the build-up of impurities—in particular MgO—in the circulating acid, about 3.3% of the hydrolysis mother liquor is separately worked up. This results in a reduction of the total yield of the process of $Al_2O_3$ of only about 1%.

Losses of sulfur, which occur through the separation of portions of the mother liquor and loss with the $SiO_2$ residues, are compensated for through the combustion of sulfur during the decomposition of the oxonium alunite or by the addition of sulfuric acid to the circulating acid.

The total yield of the process in $Al_2O_3$ approaches 82%. The hydrolysis yield is about 66%.

It will be understood that each of the elements described above, or two or more together, may also find a useful application in other types of processes for the production of pure aluminum oxide differing from the types described above.

While the invention has been illustrated and described as embodied in a process for the production of pure aluminum oxide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An improved process for producing pure aluminum oxide of the type wherein clay or clay- containing minerals undergo a two-stage treatment with sulfuric acid under the use of pressure and increased temperature, separation of the insoluble residue, reduction of the iron, hydrolysis of the aluminum sulfate solution to solid basic aluminum sulfate, and decomposition of the hydrolysis product to aluminum oxide, said improvement comprising the steps of providing in the first leaching stage an $Al_2O_3$ excess in the starting material of 60-120% related to the $Al_2O_3$ component to be leached; adding to the filtrate of the first leaching stage which is supplied to the hydrolysis, to obtain a weight ratio $SO_3:Al_2O_3$ of 2.0-2.86, sufficient magnesium sulfate for the solution supplied to hydrolysis to contain 30-90 g/l $MgSO_4$; carrying out the hydrolysis under pressure with the exclusion of oxygen and without the addition of active clay, basic aluminum sulfate or other chemicals which increase the basicity; and from the hydrolysis solution precipitating basic aluminum solfate at 220°-280°C. which is calcined to obtain alumina.

2. The process of claim 1, wherein the solution supplied to hydrolysis contains 50-110 g/l $Al_2O_3$, the weight ratio $SO_3:Al_2O_3$ is set at 2.65 and the hydrolysis is carried out at 240° C.

3. The process of claim 1, wherein a second leaching stage can be operated at normal pressure.

4. The process of claim 1 further comprising the step of cooling down the hydrolysis residue, said cooling being carried out in the temperature range of 140°-80° C. in less than 10 minutes, whereby the reverse solution effect on precipitated basic aluminum sulfate is avoided.

* * * * *